F. E. COLBURN.
DIRIGIBLE HEADLIGHT.
APPLICATION FILED AUG. 7, 1916.

1,227,885.

Patented May 29, 1917.
2 SHEETS—SHEET 1.

Witnesses
J. B. Wooden.
R. Z. Parker.

F. E. Colburn
Inventor
by C. A. Snow & Co.
Attorneys

F. E. COLBURN.
DIRIGIBLE HEADLIGHT.
APPLICATION FILED AUG. 7, 1916.
1,227,885.
Patented May 29, 1917.
2 SHEETS—SHEET 2.
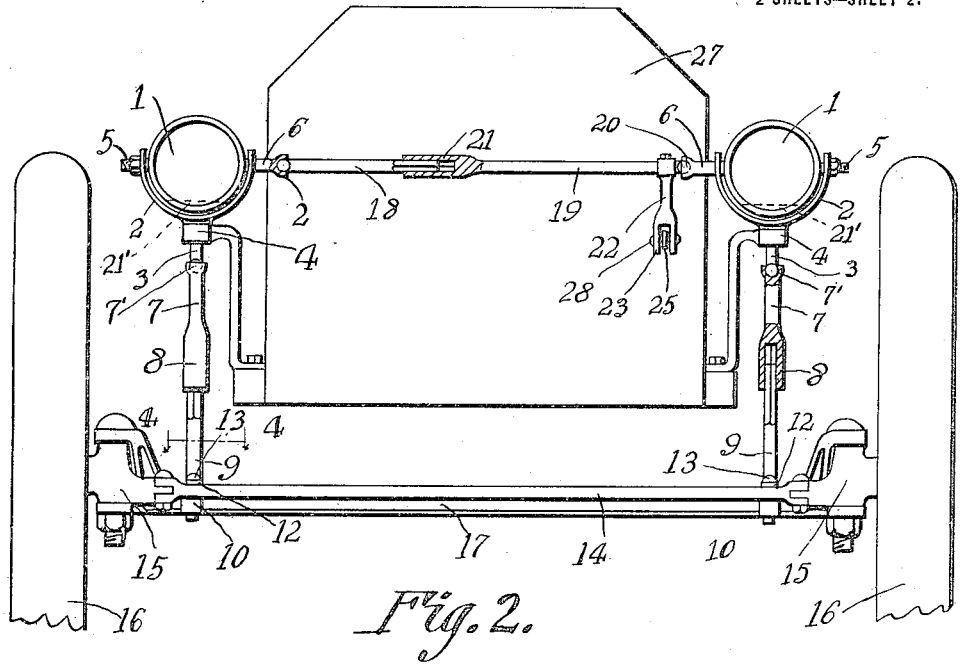
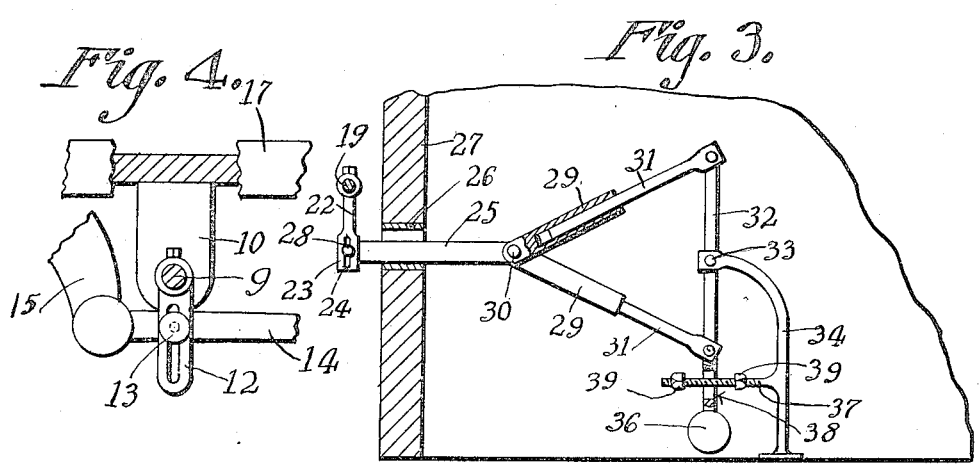
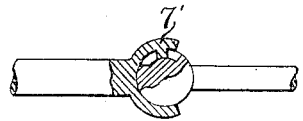
Witnesses
H. B. Wooden
R. L. Parker
F. E. Colburn, Inventor
by C. A. Snow & Co.
Attorneys

UNITED STATES PATENT OFFICE.

FRANK E. COLBURN, OF GARDINER, MAINE.

DIRIGIBLE HEADLIGHT.

1,227,885.  Specification of Letters Patent.  Patented May 29, 1917.

Application filed August 7, 1916. Serial No. 113,626.

*To all whom it may concern:*

Be it known that I, FRANK E. COLBURN, a citizen of the United States, residing at Gardiner, in the county of Kennebec and State of Maine, have invented a new and useful Dirigible Headlight, of which the following is a specification.

The present invention appertains to dirigible headlights for automobiles, and aims to provide novel and improved means for controlling the headlights by the steering gear, in order that when the car is steered to one side or the other, as when turning corners or rounding curves, the light will be directed to the side toward which the car is steered, the light being directed straight ahead when the car is moving forward, so that the light will always be directed in the path to be traversed by the car.

Another object of the invention is the provision of novel means for throwing the light upwardly when traveling upon hills, in order to illuminate the road better under such conditions.

A still further object of the invention is to provide a light controlled mechanism of comparatively simple and inexpensive construction, which can be readily applied to various automobiles, and which will be thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Fig. 2 is a front view thereof.

Fig. 3 is a section on the line 3—3 of Fig. 1.

Fig. 4 is an enlarged section on the line 4—4 of Fig. 2.

Fig. 5 is a sectional detail of a conventional form of ball and socket joint which can be used.

Figure 1:
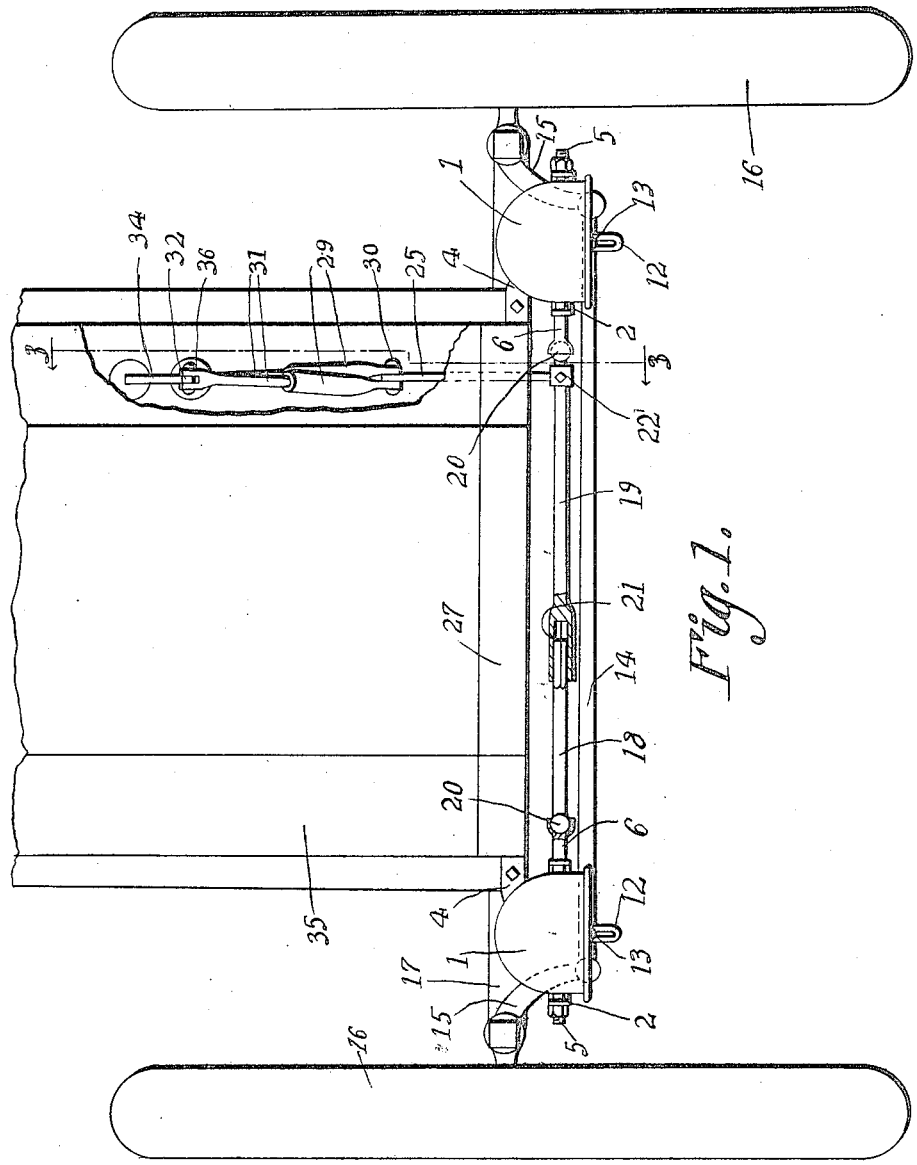
Figure 1 is a fragmental plan view of the forward portion of an automobile showing the invention applied thereto.

The headlights or lamps 1 are mounted within forks 2 for rocking movement in vertical planes about transverse axes and the said forks have downwardly projecting shanks 3 journaled for rotation in bearing brackets 4 attached in any suitable manner to the chassis of the automobile, whereby the forks and lamps are mounted for rotation about vertical axes. In order to mount the lamps for rocking movement within the forks, the opposite sides of the lamps have outstanding trunnions 5 and 6 journaled for rotation through the arms of the forks.

The forks 2 are connected to the steering gear whereby the lamps are swung toward the side toward which the car is steered and for this purpose there are provided vertical extensible shafts embodying the upper sections 7 having the upper ends connected by universal joints 7' with the shanks 3, and lower sections 9, having squared or non-circular upper ends slidable or telescoped within lower sleeves 8 with which the sections 7 are provided. A conventional ball and socket joint which can be used, is illustrated in Fig. 5, although any other suitable joint of this character can be used, so long as it provides the desired flexibility and transmits motion from one part to the other. The lower terminals of the section 9 are journaled in bearings 10 secured in any suitable manner to the front axle 17 of the automobile. The shaft sections 9 are movable vertically with the axle and can slide relative to the shaft sections 7, but the upper and lower shaft sections are constrained to rotate in unison so that the rotary movement of the shaft section 9 will be transmitted under all conditions to the sections 7 and lamps 1. The universal joints 7' are such as to permit the shafts to oscillate relative to the forks 2, due to the movements of the vehicle body and axle 17 relative to one another, without impairing the operative connection between the lamps and steering gear.

Attached to the shaft sections 9 above the bearings 10 are slotted arms 12 engaging pins or lugs 13 carried by the steering rod 14 which connects the knuckles 15 of the front wheels 16 of the automobile. It will be apparent that when the wheels 16 are turned toward one side or the other for the purpose of steering, the rod 14 will be moved in the corresponding direction, and will therefore swing the arms 12 to turn the lamp shafts and the lamps, in order that the light will be directed at the proper angle toward the side toward which the turn is made. When the car is moving straight ahead, the rod 14 will be in a normal position, so as to hold the lamps in normal position with the light directed straight ahead.

The operative connection between the lamps and the steering gear is such as to permit of the freedom of movement of the vehicle body and front axle relative to one another without disturbing such operative connection.

In order to accomplish the vertical tilting of the lamps, a transverse rock shaft is disposed between the lamps, and embodies alining sections 18 and 19 having their remote ends connected by universal joints 20 (similar to the joints 7′) with the trunnions 6 of the lamps. The inner end of the shaft section 18 is squared or non-circular and fits slidably in a sleeve 21 with which the inner end of the shaft 19 is provided whereby to slidably connect the shaft sections to permit of their relative sliding movement when the forks 2 and lamps 1 are turned sidewise, the universal joints 20 permitting of the change of angle between the trunnions 6 and shaft 18—19 connecting them. When the shaft 18—19 is rocked, this will rock the lamps 1 vertically and said lamps are weighted as at 21′, below the axes of their trunnions, so as to normally hold said lamps in horizontal position as usual.

The shaft 18—19 is pendulum-controlled, and for this purpose a depending arm 22 is secured to the shaft section 19 and has a fork 23 at its lower end whose branches are provided with vertical slots 24. The longitudinal bar 25 is slidable through a suitable guide 26 with which the radiator 27 is provided adjacent to one side thereof, and the forward protruding end of the bar 25 extends within the fork 23 and carries a pivot 28 slidable in the slots 24 of the fork 23. Rearwardly diverging tubular members 29 have their forward adjacent ends pivoted, as at 30, to the rear end of the bar 25, and rods or stems 31 are slidable in the members 29 and have rear ends pivoted to the upper and lower arms of a vertical pendulum 32 pivoted, as at 33, to a bracket or standard 34 carried by the chassis within and adjacent to one side of the engine hood 35. The bar 25, members 29, rods 31, pendulum 32 and brackets 34 are all disposed in substantially the same vertical longitudinal plane at one side of the engine (not shown). The lower end of the pendulum 32 carries a suitable weight 36 to maintain the pendulum in vertical position. The bracket 34 has a forwardly projecting stem 37 extending through a slot 38 with which the lower arm of the pendulum is provided, and nuts 39 are threaded upon the stem 37 to provide adjustable stops for limiting the movement of the pendulum in either direction.

When the automobile is traveling upon a level road, the pendulum 32 will be perpendicular to the chassis and will hold the rods 31 in normal position so that the weights 21′ will hold the lamps horizontal. Now, should the car ascend a hill, so that the chassis is inclined while the pendulum remains vertical or substantially so, the upper rod 31 will be moved forwardly toward the radiator 27 while the lower rod 31 will be moved rearwardly. The upper rod 31 will therefore shove the upper member 29 and bar 25 forwardly, swinging the arm 22 likewise, and therefore rocking the shaft 18—19 and lamps 1 to raise the light, whereby to better illuminate the road ahead. When the car returns to a level stretch of the road, normal conditions will be restored. When the car is descending a hill, it will be inclined with its forward end lowermost, while the pendulum will remain in substantially vertical position, thus moving the lower rod 31 forwardly to move the lower member 29, bar 25 and arm 22 likewise, thereby to raise the light for the above reasons. It will therefore be noted, that the lamps are tilted in the same direction, either when ascending or descending a hill, and the operative connections between the lamps and the steering gear and pendulum permit of the simultaneous swinging of the lamps in both horizontal and vertical planes, as when making a turn on a hill.

By the provision of the present mechanism the operation of the automobile is facilitated during the night time, especially when traveling upon tortuous and hilly roads, as in mountainous or hilly country.

The stop nuts 39 can be adjusted to limit the movement of the pendulum relative to the chassis, whereby to limit the movement of the lamps in their vertical planes to avoid the excessive vertical shifting of the light.

Having thus described the invention, what is claimed as new is:

1. The combination with a vehicle, of a lamp carried thereby and mounted for swinging movement in a vertical plane and about a vertical axis, means connected to the lamp for swinging it about said axis, a pendulum carried by the vehicle independent of the lamp, and means operated by the pendulum having a flexible connection with the lamp for swinging the lamp.

2. The combination with an automobile, of a lamp carried thereby for swinging movement in a vertical plane, a pendulum caried by the automobile, and means operated by the pendulum for swinging said lamp in said plane in the same direction when the automobile is inclined in either direction in ascending or descending hills.

3. In a mechanism of the character described, a lamp mounted for swinging movement in a vertical plane, a pendulum having upper and lower arms, a pair of members operatively connected with the lamp, and a second pair of members connected to the upper and lower arms of the pendulum and slidably connected with the aforesaid members and adapted to move them in one direction.

4. In a mechanism of the character described, a lamp mounted for swinging movement in a vertical plane, a pendulum having upper and lower arms, a slidable member operatively connected with the lamp, a pair of diverging members pivoted to the sliding member, and a pair of members pivoted to the upper and lower arms of the pendulum and connected slidably with said diverging members to move them in one direction.

5. The combination with an automobile and its steering gear, of a pair of members carried by the automobile for rotation about vertical axes and operatively connected with the steering gear, lamps having trunnions journaled to said members, an extensible shaft having its ends connected by universal joints with said trunnions, and means connected to said shaft for rocking it.

6. The combination with an automobile and its steering gear, of a pair of members carried by the automobile for rotation about vertical axes and operatively connected with the steering gear, lamps having trunnions journaled to said members, an extensible shaft having its ends connected by universal joints with said trunnions, and pendulum controlled means operatively connected with said shaft for rocking said shaft when the automobile is traveling on a hill.

In testimony that I claim the foregoing as my own, I have hereto affixed my signature in the presence of two witnesses.

FRANK E. X COLBURN.
his
mark

Witnesses:
ERNEST L. GOODSPEED,
HERBERT T. GOODWIN.

Copies of this patent may be obtained for five cents each, by addressing the "Commissioner of Patents, Washington, D. C."